US012490669B1

(12) United States Patent
Abts et al.

(10) Patent No.: US 12,490,669 B1
(45) Date of Patent: Dec. 9, 2025

(54) METHOD AND APPARATUS FOR PUMPING A FLUID ADDITIVE INTO AN IRRIGATION SYSTEM FOR FIELD APPLICATION

(71) Applicant: Fieldbot, LLC, Newport Beach, CA (US)

(72) Inventors: Kevin J. Abts, Newport Beach, CA (US); Gerald L. Abts, Highlands Ranch, CO (US); Leslie H. Bruntz, Elkhorn, NE (US); D. James Gonske, Redding, CA (US)

(73) Assignee: FIELDBOT, LLC, Newport Beach, CA (US)

( * ) Notice: Subject to any disclaimer, the term of this patent is extended or adjusted under 35 U.S.C. 154(b) by 885 days.

(21) Appl. No.: 17/538,099

(22) Filed: Nov. 30, 2021

Related U.S. Application Data

(60) Provisional application No. 63/119,994, filed on Dec. 1, 2020.

(51) Int. Cl.
*A01C 23/04* (2006.01)
*A01G 25/09* (2006.01)
*A01G 25/16* (2006.01)
*F04B 49/06* (2006.01)

(52) U.S. Cl.
CPC .......... *A01C 23/042* (2013.01); *A01G 25/092* (2013.01); *A01G 25/16* (2013.01); *F04B 49/065* (2013.01)

(58) Field of Classification Search
CPC ..... F04B 49/065; A01G 25/16; A01G 25/092; A01C 23/042

USPC ....................................................... 239/310
See application file for complete search history.

(56) References Cited

U.S. PATENT DOCUMENTS

| | | |
|---|---|---|
| 3,587,763 A | 6/1971 | Kinkead |
| 3,797,517 A | 3/1974 | Kircher |
| 3,807,436 A | 4/1974 | Pringle |
| 3,823,730 A | 7/1974 | Sandstrom |
| 3,902,668 A | 9/1975 | Daugherty |
| 3,952,769 A | 4/1976 | Ott |
| 3,979,062 A | 9/1976 | Christensen |
| 4,034,778 A | 7/1977 | Sage |
| 4,063,569 A | 12/1977 | Olson |
| 4,186,880 A | 2/1980 | Jacobi |
| 4,191,207 A | 3/1980 | Jacobi |
| 4,202,596 A | 5/1980 | Knudsen |
| 4,226,366 A | 10/1980 | Nortoft |
| 4,266,732 A | 5/1981 | Sage |

(Continued)

*Primary Examiner* — Joseph A Greenlund
*Assistant Examiner* — Kevin Edward Schwartz
(74) *Attorney, Agent, or Firm* — ONE LLP

(57) ABSTRACT

An apparatus may include a reservoir configured to hold a fluid additive, an injector element to inject the fluid additive into the primary fluid applied to a ground surface by the irrigation apparatus, a flow sensor to measure the flow of the fluid additive from the reservoir to the injector element, and a pump apparatus controller configured to maintain a rate of pumping of the fluid additive based on the output of the flow sensor. The additive pumping apparatus configured to vary a pump motor speed and thereby the rate at which the fluid additive may be pumped into the primary fluid of the fluid application assembly, the adjustment to the pumping rate being based upon the current position and the actual speed of movement of the distal-end of the outermost span of the irrigation apparatus in the field.

11 Claims, 4 Drawing Sheets

(56) References Cited

U.S. PATENT DOCUMENTS

| | | |
|---|---|---|
| 4,290,556 A | 9/1981 | Mcconnell |
| 4,290,559 A | 9/1981 | Mayer |
| 4,303,203 A | 12/1981 | Avery |
| 4,340,183 A | 7/1982 | Kegel |
| 4,371,116 A | 2/1983 | Sage |
| 4,434,936 A | 3/1984 | Chapman |
| RE31,838 E | 2/1985 | Seckler |
| 4,508,269 A | 4/1985 | Davis |
| 4,564,224 A | 1/1986 | Korus |
| 4,569,481 A | 2/1986 | Davis |
| 4,580,731 A | 4/1986 | Kegel |
| 4,662,563 A | 5/1987 | Wolfe, Jr. |
| 4,763,836 A | 8/1988 | Lyle |
| 4,878,614 A | 11/1989 | Hach |
| 4,899,934 A | 2/1990 | Krisle |
| 5,246,164 A | 9/1993 | Mccann |
| 5,255,857 A | 10/1993 | Hunt |
| 5,334,987 A | 8/1994 | Teach |
| 5,341,995 A | 8/1994 | Leatch |
| 5,613,641 A | 3/1997 | Grothen |
| 5,653,389 A | 8/1997 | Henderson |
| 5,695,129 A | 12/1997 | Korus |
| 5,740,038 A | 4/1998 | Hergert |
| 5,862,997 A | 1/1999 | Reinke |
| 5,904,296 A | 5/1999 | Doherty |
| 5,913,915 A | 6/1999 | Mcquinn |
| 5,919,242 A | 7/1999 | Greatline |
| 5,927,603 A | 7/1999 | Mcnabb |
| 5,947,393 A | 9/1999 | Unruh |
| 5,950,921 A | 9/1999 | Cain |
| 5,955,973 A | 9/1999 | Anderson |
| 5,978,723 A | 11/1999 | Hale |
| 5,986,604 A | 11/1999 | Nichols |
| 5,991,694 A | 11/1999 | Gudat |
| 5,995,895 A | 11/1999 | Watt |
| 6,007,004 A | 12/1999 | Unruh |
| 6,036,121 A | 3/2000 | Gerdes |
| 6,036,122 A | 3/2000 | Gerdes |
| 6,042,031 A | 3/2000 | Christensen |
| 6,045,065 A | 4/2000 | Gerdes |
| 6,045,066 A | 4/2000 | Gerdes |
| 6,045,333 A | 4/2000 | Breit |
| 6,062,165 A | 5/2000 | Sieling |
| 6,068,197 A | 5/2000 | Tolson |
| 6,085,999 A | 7/2000 | Gerdes |
| 6,095,439 A | 8/2000 | Segal |
| 6,108,590 A | 8/2000 | Hergert |
| 6,199,000 B1 | 3/2001 | Keller |
| 6,290,151 B1 | 9/2001 | Barker |
| 6,337,971 B1 | 1/2002 | Abts |
| 6,469,628 B1 | 10/2002 | Richards |
| 6,507,782 B1 | 1/2003 | Rumbo |
| 6,512,992 B1 | 1/2003 | Fowler |
| 6,517,281 B1 | 2/2003 | Rissi |
| 6,522,948 B1 | 2/2003 | Benneweis |
| 6,594,706 B1 | 7/2003 | Decoursey |
| 6,633,786 B1 | 10/2003 | Majors |
| 6,666,384 B2 | 12/2003 | Prandi |
| 6,711,501 B2 | 3/2004 | Mcclure |
| 6,755,362 B2 | 6/2004 | Krieger |
| 6,820,828 B1 | 11/2004 | Greenwalt |
| 6,853,883 B2 | 2/2005 | Kreikmeier |
| 6,923,390 B1 | 8/2005 | Barker |
| 6,928,339 B2 | 8/2005 | Barker |
| 6,978,794 B2 | 12/2005 | Dukes |
| 7,384,008 B1 | 6/2008 | Malsam |
| 7,584,023 B1 | 9/2009 | Palmer |
| 7,584,053 B2 | 9/2009 | Abts |
| 7,976,284 B2 | 7/2011 | Koehl |
| 8,028,470 B2 | 10/2011 | Anderson |
| 8,145,360 B2 | 3/2012 | Brundisini |
| 8,401,704 B2 | 3/2013 | Pollock |
| 8,490,899 B2 | 7/2013 | Korus |
| 8,738,212 B1 | 5/2014 | Schieffelin |
| 8,849,468 B2 | 9/2014 | Abts |
| 8,948,979 B2 | 2/2015 | Malsam |
| 9,329,580 B2 | 5/2016 | Heuert |
| 9,342,076 B2 | 5/2016 | Malsam |
| 9,374,949 B2 | 6/2016 | Abts |
| 9,459,628 B1 | 10/2016 | Abts |
| 9,661,808 B2 | 5/2017 | Abts |
| 9,874,489 B2 | 1/2018 | Jerphagnon |
| 9,888,081 B1 | 2/2018 | Farinelli, Jr. |
| 10,048,663 B2 | 8/2018 | Abts |
| 10,130,054 B2 | 11/2018 | Abts |
| 10,165,741 B2 | 1/2019 | Abts |
| 10,384,557 B2 | 8/2019 | Abts |
| 10,582,671 B2 | 3/2020 | Abts |
| 2002/0008167 A1 | 1/2002 | Haberland |
| 2002/0066810 A1 | 6/2002 | Prandi |
| 2003/0066912 A1 | 4/2003 | Krieger |
| 2003/0229432 A1 | 12/2003 | Ho |
| 2004/0093912 A1 | 5/2004 | Krieger |
| 2004/0117070 A1 | 6/2004 | Barker |
| 2006/0027677 A1 | 2/2006 | Abts |
| 2007/0267524 A1 | 11/2007 | Mack |
| 2008/0269956 A1 | 10/2008 | Dix |
| 2009/0216410 A1 | 8/2009 | Allen |
| 2010/0032493 A1 | 2/2010 | Abts |
| 2010/0032495 A1 | 2/2010 | Abts |
| 2010/0141194 A1 | 6/2010 | Koehl |
| 2011/0181226 A1 | 7/2011 | Steiner |
| 2012/0053776 A1 | 3/2012 | Malsam |
| 2012/0253530 A1 | 10/2012 | Malsam |
| 2012/0305682 A1 | 12/2012 | Korus |
| 2013/0018509 A1 | 1/2013 | Korus |
| 2013/0018553 A1 | 1/2013 | Malsam |
| 2013/0090766 A1 | 4/2013 | Pfrenger |
| 2013/0211717 A1 | 8/2013 | Abts |
| 2013/0218402 A1 | 8/2013 | Hoshihara |
| 2013/0226356 A1 | 8/2013 | Pfrenger |
| 2013/0253752 A1 | 9/2013 | Grabow |
| 2013/0341419 A1 | 12/2013 | Pfrenger |
| 2014/0225747 A1 | 8/2014 | Abts |
| 2014/0263706 A1 | 9/2014 | Wolgast |
| 2014/0326808 A1 | 11/2014 | Malsam |
| 2015/0060580 A1 | 3/2015 | Welch |
| 2015/0102136 A1 | 4/2015 | Malsam |
| 2015/0129680 A1 | 5/2015 | Abts |
| 2015/0150200 A1 | 6/2015 | Abts |
| 2015/0351335 A1 | 12/2015 | Abts |
| 2016/0014982 A1 | 1/2016 | Malsam |
| 2016/0103162 A1 | 4/2016 | Safa-Bakhsh |
| 2021/0022302 A1* | 1/2021 | Ricketts ............... B05B 12/087 |

\* cited by examiner

METHOD AND APPARATUS FOR PUMPING A FLUID ADDITIVE INTO AN IRRIGATION SYSTEM FOR FIELD APPLICATION

REFERENCE TO RELATED APPLICATIONS

This application claims the priority benefit of U.S. Provisional Patent Application No. 63/119,994, filed Dec. 1, 2020, which is hereby incorporated by reference in its entirety.

BACKGROUND

Field

The present disclosure relates to field irrigation systems and more particularly pertains to methods and apparatus for pumping and injecting a fluid additive into a primary fluid of an irrigation system for field application for facilitating more accurate application of the fluid additive when field conditions or other issues vary the intended speed of movement to an actual speed of movement that does not match the intended speed movement of the irrigation system in the field.

Description of the Prior Art

Field irrigation systems utilized to provide moisture to the plants and soil of an agricultural field are known, and it is known to use the systems to provide various beneficial substances (additives other than water) to the plants and soil by adding the substances to the water (primary fluid) distributed by the irrigation system prior to application of the water to the field. A common irrigation system design is a "center pivot" irrigation systems in which an arm comprised of at least one pipe span radiates outwardly from a center structure, and rotates or pivots about the center structure to move the spans across the field while applying fluid to the soil and plants of the field. Said center structure configured to support a first-end of a first span and provide an apparatus for of centering the rotation of a plurality of spans extending outward from said center structure.

Another irrigation system design is a lateral move irrigation system in which an entirety of the pipe span (or spans) moves across the surface of the field in translational, rather than pivoting, movement. The pipe spans are typically supported by support towers carried on wheels driven by drive assemblies to move the support towers, and the supported pipe spans, across the ground surface. In some installations, the positioning of large volume fluid-sprinkling guns on the end of the outermost span may be used to extend the area of the ground surface of the field on which fluid is applied.

Areas of the field surface to which fluid is being applied by the irrigation system may be referred to as field sectors. The sectors may each be defined as the area irrigated by the irrigation system between two defined positions of the spans of the irrigation system. In the case of a center pivot irrigation system, the field sectors may have a generally triangular or pie piece shaped perimeter, while in the case of a lateral move irrigation system, the field sectors may be generally rectangular.

Systems have been utilized for injecting liquid products or fluid additives into the water of an irrigation system so that the combination of the water and the liquid additive may be applied to the plants and/or soil of the field. For example, the liquid products or fluid additives may include fertilizers, herbicides, foliates, and pesticides.

Uniform application of each fluid additive to the plants and/or soil is important for maximizing the effectiveness and efficiency of the applications. While variations in the application rate of a primary fluid, i.e., water, from field sector to sector is of some concern, variations in the application rate of the combined water and fluid additives can be more problematic, ranging from applying too little fluid additive to be effective, to applying too much fluid additive which may waste the fluid additive (at best) and may create toxic conditions (at worst).

Conventional fluid additive pumping and injection systems typically depend on the operator to define a fluid additive pumping rate (e.g., liquid fluid additive volume per unit of ground surface area) and the intended speed of movement of the irrigation system over the ground surface. Effective operation may also depend upon the irrigation system maintaining the predetermined or intended speed of movement to achieve a uniform distribution of the fluid additive at the desired rate to the plants and/or soil.

Deviation from the operator-defined or preselected or intended speed of movement by the spans of the irrigation system, such as slowing to an actual speed of movement by the spans, is thus likely to affect the uniformity of the intended rate of application of both the primary fluid, water, and the fluid additive, and may result from operational conditions, such as operating with low tire pressures in the wheels, or field conditions such as slippage of drive wheels in water soaked wheel tracks, undulating topography of the ground surface being navigated by the drive wheels, as well as other conditions. These conditions may unpredictably increase the amount of time needed for the irrigation system to traverse the field sector and, as a result, may cause the irrigation system to not arrive at a designated end or stop position in the field in the predicted elapsed time. A field sector may be any portion of the field underlying the irrigation system, including the whole field.

Unanticipated increases (or decreases) in in the amount of time needed for the spans of the irrigation system to traverse a field sector at an actual speed of movement which may be slower (or faster) than the intended speed of movement may result in unpredictable variations in the application rate of both the primary fluid and the fluid additive per unit of field area, as conventional systems pump both the primary fluid and the fluid additive at a fixed rate selected for the intended speed of movement for the irrigation system. Thus, if the irrigation system traverses the field sector in a shorter period of time than intended, the actual injection rate of the fluid additive being pumped may be deficient. If the irrigation system traverses the field sector in a longer time period than intended, then the actual pumping and injection rate for a fluid additive may also be deficient due to the supply of fluid additive being exhausted prior to reaching the stop position (in which the final portion of the field sector may not receive any fluid additive at all).

It should be known by those familiar with the art that the speed of movement of an irrigation system such as a center pivot is set by controlling the pace of movement of the outermost drive assembly of an outermost support tower supporting the outermost span of the irrigation system. All other spans and the corresponding drive assemblies and support towers move at slower pace of movement and typically use electro mechanical signals to maintain a straight alignment of all intermediate spans with the pace-setting outermost span.

One approach to addressing deviations in the actual speed of movement (from the intended speed of movement) has been to adjust the speed of movement of the spans of the irrigation apparatus over the agricultural field surface in an attempt to keep the actual speed of movement as close as possible to the intended speed of movement and thus maintain the effective fluid additive application rate to the plants and/or soil of the field closer to the desired application rate. Basically, the approach has been to increase the speed of movement of the spans (when it is detected that the actual speed of movement of the spans has lagged the intended speed of movement) to achieve the desired fluid additive application rate. Conversely, when it is detected that the actual speed of movement of the spans has exceeded the intended speed of movement, the operation of the irrigation system may be adjusted to slow down the speed of movement of the spans to achieve the desired fluid additive application rate.

For example, U.S. Pat. No. 9,342,076 of Malsam proposes to modify the control assembly (main control panel) of an irrigation system to determine an actual current position of the irrigation system in the field and increase or decrease the speed of movement of the system to achieve an arrival at the predetermined stop position at the predetermined arrival time. While this approach could be effective, it requires modification of the control assembly for the irrigation system and intervention with the control assembly when the actual current position deviates from the expected current position. Implementation of this approach can be complicated by the variations in the operation of main control panels of irrigation systems produced by different manufacturers in different years, and thus may require specialized equipment for application to irrigation systems of different manufacturers and different years of manufacture.

SUMMARY

The present disclosure relates to apparatus for varying the rate at which a fluid additive is pumped and injected into a primary fluid, such as water, being distributed by an irrigation apparatus in a field to help compensate for variations in the actual speed of movement of the irrigation apparatus across a field as compared to an intended speed of movement. The present disclosure also relates to methods implemented by the apparatus.

In another aspect, the disclosure relates to a fluid additive pumping apparatus for use with an irrigation apparatus movable over a ground surface of a field for distributing a primary fluid. The irrigation apparatus may be of the type having a plurality of spans generally extending along a longitudinal axis, a fluid application assembly configured to apply the primary fluid to the ground surface of the field, and a position sensor assembly configured to sense a current position of the pace-setting outermost span of the irrigation apparatus with respect to a reference position of said span.

The fluid additive pumping apparatus may comprise a fluid additive reservoir configured to hold a quantity of the fluid additive, and the fluid additive path may originate at the reservoir. The fluid additive pumping apparatus may further comprise a fluid additive injector element in fluid communication with the fluid additive reservoir and the fluid application assembly to inject the pumped fluid additive from the reservoir into the primary fluid applied to the ground surface, and the fluid additive path may terminate at the fluid additive injector element.

The fluid additive pumping apparatus may also comprise a fluid additive flow valve and a fluid additive flow sensor, both in fluid communication with the fluid additive reservoir and the fluid additive injector element to control the flow of the fluid additive pumped from the reservoir to the injector element, and the fluid additive path may extend through the flow valve and flow sensor. The fluid additive pumping apparatus may further include a pump apparatus controller configured to control a rate of pumping of the fluid additive by the fluid additive pump assembly (pump device and pump motor) of the fluid additive pumping apparatus to the fluid application assembly (and the corresponding fluid sprinkler applicators) over the field sector. The pump apparatus controller may be configured to monitor a rate of pumping, based on pumping status delivered by the fluid additive flow sensor, and vary said rate at which the fluid additive being pumped may be injected into the primary fluid of the fluid application assembly. The rate of pumping of fluid additive by the fluid additive pumping apparatus may initially be set by an operator or calculated by a processor based on elements of an application. Once in operation the rate of pumping, as monitored by the pump apparatus controller of the fluid additive pump apparatus using information from the fluid additive flow sensor, may be adjusted by a pump apparatus controller. Said pump controller may also be in communication with the end-of-system position sensor. Furthermore, the rate of pumping by the fluid additive pump assembly may be adjusted based on variations in the intended speed of movement as compared to an actual speed of movement by the irrigation apparatus, said actual speed of movement may be periodically calculated by the pump apparatus controller in communication with the position sensor.

In still another aspect, the disclosure relates to an irrigation system for distributing a primary fluid over a ground surface of a field and may comprise an irrigation apparatus movable over the ground surface to distribute the primary fluid over the ground surface. The irrigation apparatus may include at least two spans, and generally three or more spans, extending along a longitudinal axis of the irrigation apparatus, at least one support tower for each corresponding span configured to support the span at a location above the ground surface, a fluid application assembly configured to apply the primary fluid to the ground surface of the field, and a position sensor assembly configured to sense a current position of the outermost span of the irrigation apparatus with respect to a reference position of the span.

The system may further include a fluid additive pumping apparatus configured to pump a fluid additive into a primary fluid distributed by the fluid application assembly of the irrigation apparatus as the irrigation apparatus moves over a sector of the field. The fluid additive pumping apparatus may comprise a fluid additive reservoir, configured to hold a quantity of the fluid additive with the fluid additive path originating at the fluid additive reservoir, and a fluid additive injector element in fluid communication with the reservoir and the fluid additive application assembly. The fluid additive may be pumped from the fluid additive reservoir into the primary fluid (being applied to the ground surface) with the fluid additive path terminating at the fluid additive injector element. The fluid additive pumping apparatus may also include a fluid additive flow valve and a fluid additive flow sensor both in fluid communication with the fluid additive reservoir and the fluid additive injector element to monitor the flow of the fluid additive being pumped from the reservoir to the fluid additive injector element, with the fluid additive path extending through the flow valve and flow sensor.

A pump apparatus controller of the fluid additive pumping apparatus may be configured to control a rate of pumping of the fluid additive to the fluid additive injector element for distribution by the fluid application assembly over the field sector. Furthermore, the fluid additive pump assembly of the fluid additive pumping apparatus may be controlled by the pump apparatus controller to vary a rate at which the fluid additive is pumped into the primary fluid of the fluid application assembly based upon feedback from a fluid additive flow sensor and on an actual speed of movement of the outermost span as calculated based on the current position as compared to an intended position of the outermost span of the irrigation apparatus in the field sector. Said positions may be periodically monitored by the end-of-system position sensor in communication with the pump apparatus controller.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter, and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, and methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes references to the annexed drawings wherein.

DETAILED DESCRIPTION

Figure 1:
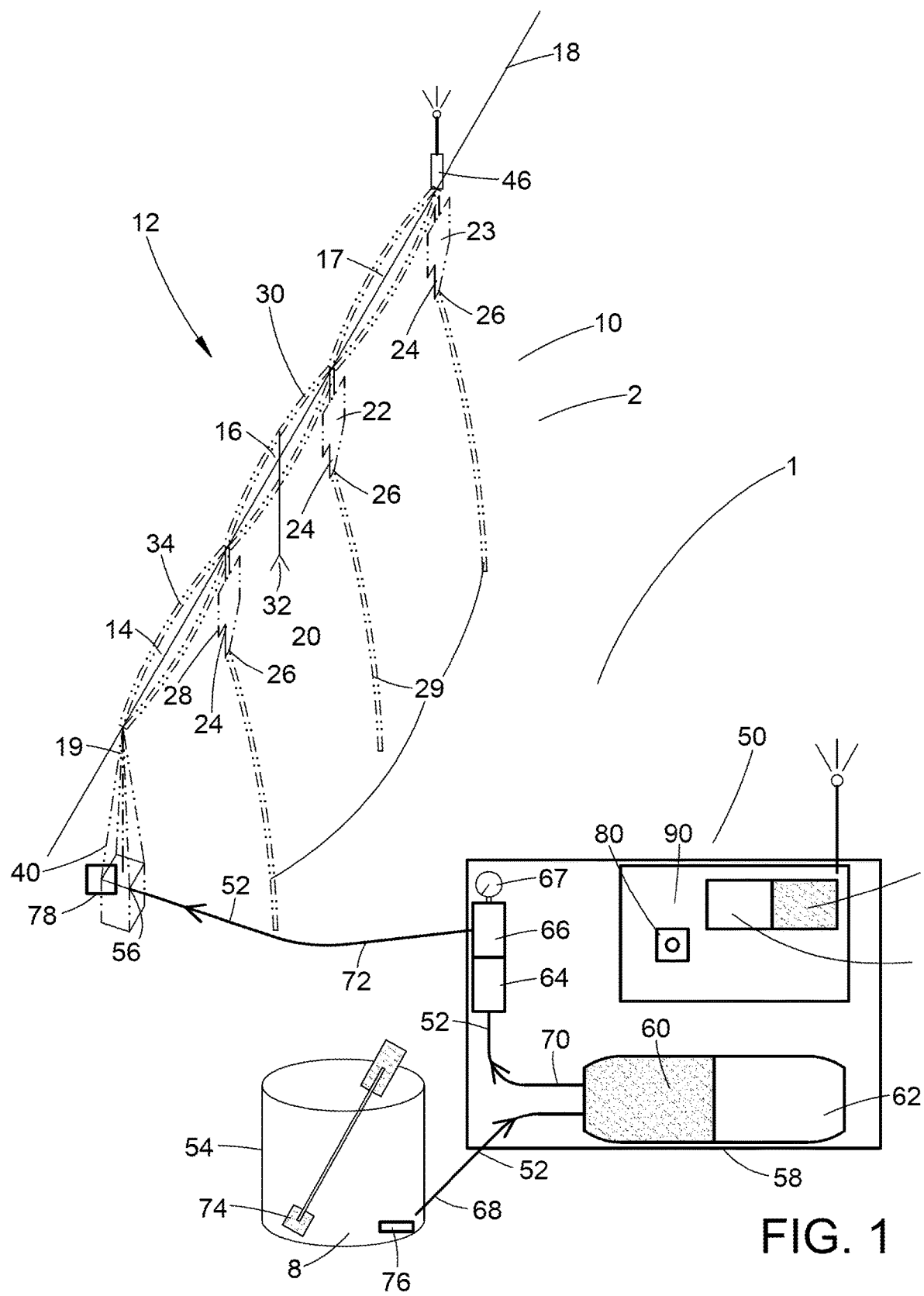
FIG. 1 is a schematic diagram of an irrigation system and a fluid additive pump apparatus making up an irrigation apparatus located in a field illustrating aspects of an illustrative implementation of a method of the present disclosure.

With reference now to the drawings, and in particular to FIGS. 1 through 4 thereof, a new method and apparatus for pumping and injecting a fluid additive into an irrigation system for field application embodying the principles and concepts of the disclosed subject matter will be described.

The applicants have recognized the drawbacks in known irrigation systems, particularly in the area of apparatus utilized to add or inject an additive to the irrigation water being applied to the soil and/or plants of the agricultural field.

Conventionally the primary fluid supply (e.g., water) to an irrigation apparatus may flow to the irrigation system at a constant rate or uniform rate. For example, a primary fluid flow rate of approximately 850 gallons per minute may result in an application rate of the primary fluid of approximately 7.0 gallons per minute per acre in a typical size of irrigation system. The rate of application of a primary fluid by the irrigation system to a ground surface of a field may generally be varied by adjusting the speed of movement over the ground surface of the roving spans of the irrigation system, as the flow of the primary fluid through the system is maintained at a constant or uniform level.

Conventionally the outermost span of the irrigation apparatus sets the speed of movement; and all other spans move at a pace to keep up with the outermost span, the outermost span having the largest circumference of travel (i.e., wheel track). While irrigation systems may be configured or programmed to maintain a nominal or intended speed of movement across the ground surface, typically the apparatus does not maintain the intended speed of movement necessary to apply a fluid additive, such as a foliate, in a predictable and uniform manner over the ground surface of a field. For example, wheels of a drive assembly driving the outermost span over the ground surface may slip, slowing the actual speed of movement of the irrigation system. As another example, traversing downward slopes by the system may create momentum causing the outermost wheels to roll forward, and result in a somewhat faster actual speed of movement of the outermost support tower and its corresponding drive assembly, while traversing upward slopes may lose momentum, and result in a somewhat slower actual speed of movement as compared to an intended speed of movement.

Therefore, the deviations in the actual speed of movement of the outermost span from an intended speed of movement can diminish the uniformity in which the fluid additive may be applied by the irrigation system. The applicants also recognize the solutions that have been attempted may be unnecessarily complicated because these prior attempts try to modify the speed of movement of the irrigation system to compensate when deviations from the intended speed of movement occur, and thus require a substantial interface with the control panel circuitry (control assembly) of the irrigation system.

One advantageous aspect of the system of the present disclosure is the avoidance of any need to modify the irrigation apparatus of the irrigation system with equipment needed to modify the speed of movement of the outermost span of the irrigation apparatus in order to correct the application rate of the fluid additive to the ground surface. Such an advantageous aspect of the present disclosure enhances the flexibility of application of the fluid additive pumping apparatus to a variety of irrigation systems produced by different manufacturers with different control assembly designs, and also facilitates the ease with which the fluid additive pumping apparatus may be universally integrated with most if not all of those irrigation systems.

In general, the present disclosure relates to a fluid additive pumping apparatus configured to adjust the rate of pumping of a fluid additive that may be injected into the typically constant volume flow of pressurized water supply (primary fluid) of an irrigation apparatus, and adjust the rate of pumping of the additive fluid being injected as needed to compensate for variations in the actual speed of movement from the intended speed of movement for said irrigation apparatus. The fluid additive pumping apparatus of the present disclosure may substantially continuously monitor and adjust the rate of pumping of the fluid additive being injected into the water supply delivered to the irrigation apparatus to provide a predefined amount (e.g., volume) of the fluid additive over a predefined field sector (an area to be treated) of a field, and may accomplish the pumping of the predefined amount of fluid additive being injected in a predefined period of time.

Figure 2:
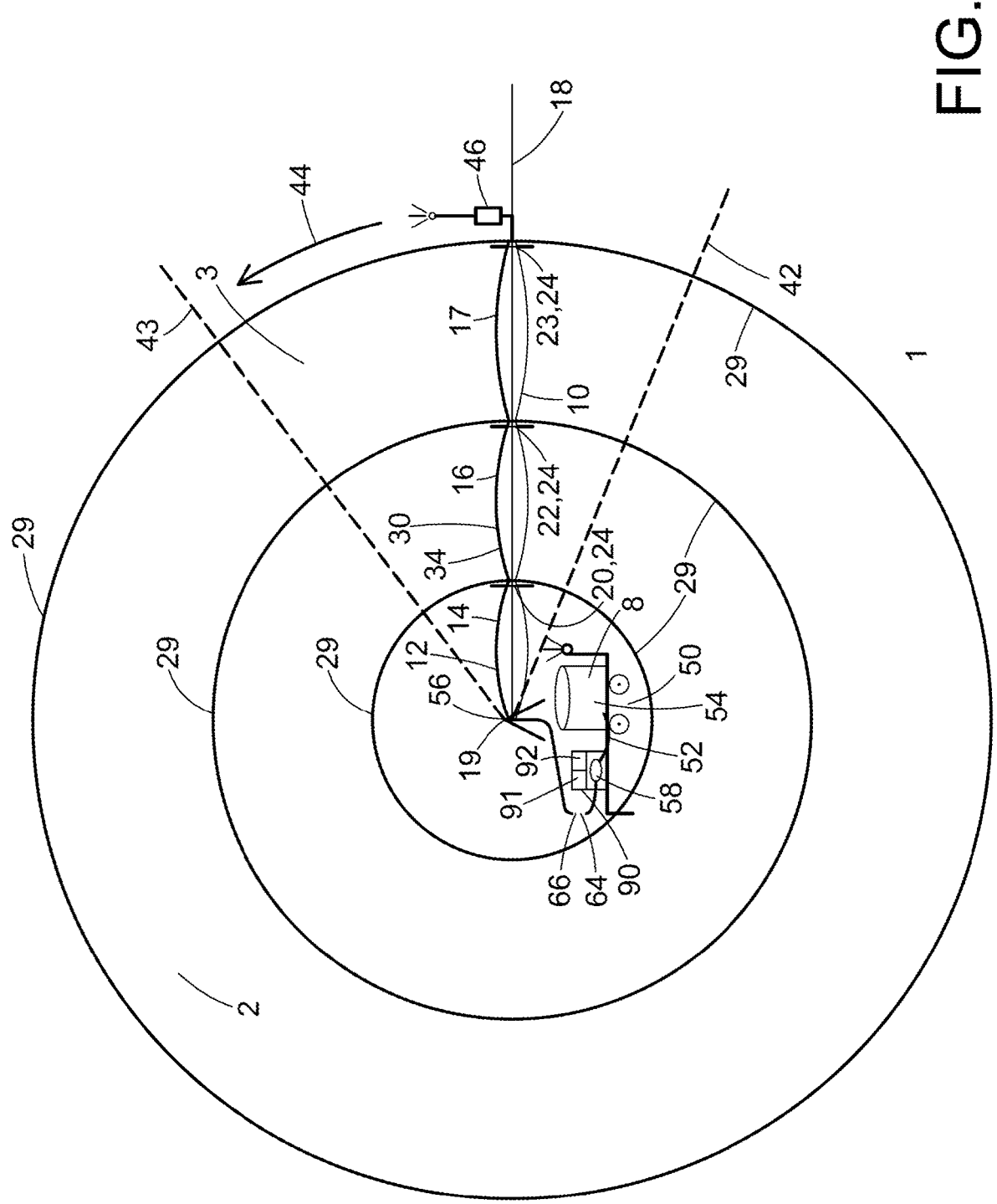
FIG. 2 is a schematic diagram of a center pivot field with an irrigation apparatus including a center pivot and a fluid additive pumping apparatus with a defined field sector illustrating aspects of an illustrative implementation of a method of the present disclosure.

In one aspect, with reference to FIG. 1 and FIG. 2, the disclosure relates to an irrigation system 10 for distributing a fluid over the ground surface 2 of the field 1, such as an agricultural field of soil with or without plants growing in the soil. The irrigation system 10 may include an irrigation apparatus 12, with corresponding fluid sprinkler applicators 32, which is movable over the ground surface 2 to distribute a primary fluid over the ground surface formed by the soil, and any plants growing in the soil. The irrigation apparatus 12 may include at least two spans 14, 16 and generally three or more spans 14, 16, 17 extending along a longitudinal axis 18 of the irrigation apparatus 12, and the spans 14, 16, 17 may be connected together at junctures between the spans 14 and 16 and between 16 and 17. The spans 14, 16, 17 may radiate outwardly from a center structure 19 of the irrigation apparatus 12. The irrigation apparatus 12 may also include a support tower 20, 22, 23 at a distal-end (a first-end being closest to the center structure 18) of each corresponding span 14, 16, 17 which may each be configured to support a corresponding span 14, 16, 17 at a location elevated above the ground surface 2. Each intermediate support tower 20, 22 typically may be located adjacent to a corresponding juncture between the intermediate spans 14 and 16 and also at the distal-end of the outermost third span 17. Drive assemblies 24 may be associated with corresponding support towers 20, 22, 23 to move said towers 20, 22, 23 over the ground surface 2 as well as the spans 14, 16, 17 supported by the support towers 20, 22, 23. The drive assemblies 24 may each include at least one wheel 26 which is configured to contact the ground surface 2 below the irrigation apparatus 12, and a corresponding span motor 28 which is configured to drive the wheel 26 along a corresponding wheel track 29. In common configurations, a pair of the wheels 26 may be mounted on a beam (not clearly shown) at the lower end of the support tower 20, 22, 23 as components of a drive assembly 24 and one or both of the wheels 26 may be operated by a corresponding span motor 28 to drive the wheels 26 of each corresponding drive assembly 24 along a corresponding wheel track 29.

The irrigation apparatus 12 may also include a fluid application assembly 30 which is configured to apply the primary fluid to the ground surface 2 (including, e.g., soil and/or plants). The fluid application assembly 30 may include at least one fluid sprinkler applicator 32 mounted on at least one of the spans 14, 16, 17 and each span may include at least one, and typically more than one, fluid sprinkler applicator 32. A fluid supply conduit 34 may be configured to supply a primary fluid to the fluid sprinkler applicators 32, and may be in communication with a volume of pressurized water from a water source, such as a well and pump, and in some implementations the fluid supply conduit 34 forms an integral part of the fluid application assembly 30, i.e., structure of the spans 14, 16, 17. A control assembly 40, typically located at the center structure 19, of the irrigation apparatus 12 may control operation of the irrigation apparatus 12, and in particular may (attempt to) maintain the intended speed of movement of the distal-end of the outermost third span 17 of the apparatus 12 across the ground surface 2 to provide the desired amount of primary fluid (water) to the soil and plants growing in the agricultural field 1.

A position sensor assembly 46 may be associated with irrigation apparatus 12 and may be configured to sense the current position of the distal-end of the outermost third span 17 of the irrigation apparatus 12 with respect to a reference point or position for the outermost third span 17. For example with reference to FIGS. 2 and 3, the current position of the outermost third span 17 may be measured as an angular orientation in degrees of the longitudinal axis 18 in the current position with respect to an angular orientation in degrees of the outermost third span 17 in a reference position.

The irrigation system 10 may include a fluid additive pumping apparatus 50 in combination with the irrigation apparatus 12, although in some aspects of the disclosure the fluid additive pumping apparatus 50 is independent of any irrigation apparatus 12. The fluid additive pumping apparatus 50 may be configured to pump and inject a fluid additive 8 into the primary fluid (water) distributed by the fluid supply conduit 34 during operation of the irrigation apparatus 12. The fluid additive pumping apparatus 50 may be in fluid communication with the fluid supply conduit 34 of the fluid application assembly 30 of the irrigation apparatus 12 to inject, or otherwise add, the fluid additive 8 into the primary fluid (water) flowing in the fluid supply conduit 34.

In general, the fluid additive pumping apparatus 50 may be configured to pump the fluid additive 8 at a variable flow or changeable rate over a period of time during movement of the irrigation apparatus 12 within a sector 3 over the ground surface 2 of the field 1. The fluid additive pumping apparatus 50 may include a fluid additive path 52 from a fluid additive reservoir 54 of the fluid additive pumping apparatus 50 to the fluid application assembly 30 of the irrigation apparatus 12.

As illustrated in FIG. 1, the fluid additive pumping apparatus 50 may include a fluid additive reservoir 54 which is configured to hold a quantity of the fluid additive 8 to be added to the primary fluid flowing through the fluid supply conduit 34 of irrigation apparatus 12. The fluid additive reservoir 54 may have an interior configured to hold a quantity of the fluid additive 8, and as such the fluid additive path 52 may originate at the reservoir 54. Suitable structure (not shown) may be provided to permit the introduction of the fluid additive 8 into the interior of the fluid additive reservoir 54 as needed.

A fluid additive pump assembly 58 may be provided for the fluid additive pumping apparatus 50 which is in fluid communication with the fluid additive reservoir 54 and a fluid additive injector element 56 for the purpose of pumping the fluid additive 8 from the fluid additive reservoir 54 to the fluid additive injector element 56 by way of fluid additive path 52. The fluid additive path 52 may extend through the fluid additive pump assembly 58. The fluid additive injector element 56 may be mounted on the fluid supply conduit 34 and may be located at the center structure 19. The fluid additive path 52 may effectively terminate at the fluid additive injector element 56.

Illustratively, the fluid additive pump assembly 58 may include a pump device 60 and a pump motor 62. Said pump motor 62 may be configured to operate the pump device 60 of fluid additive pump assembly 58 to pump the fluid additive 8 at variable rates of pumping.

The fluid additive pumping apparatus 50 may also include a fluid additive flow valve 64 and a fluid additive flow sensor 66, each of which may be in fluid communication with the fluid additive pump assembly 58 and the fluid additive injector element 56 to control the flow of the fluid additive 8 from the fluid additive reservoir 54 to the fluid additive injector element 56, and the fluid additive path 52 may extend through the fluid additive flow valve 64 and the fluid additive flow sensor 66.

The fluid additive flow sensor 66 for the fluid additive pumping apparatus 50 may be configured to sense a flow rate of the fluid additive 8 being pumped at variable rates by the fluid additive pump assembly 58 of the fluid additive pumping apparatus 50 to the fluid additive injector element 56 for injection into the primary fluid (water) carried by the fluid supply conduit 34 and the fluid application assembly 30. The fluid additive flow sensor 66 may be in fluid communication with the fluid additive injector element 56 and the fluid additive pump assembly 58, and the fluid additive path 52 may extend through the flow sensor 66.

As illustratively shown in FIG. 1, first, second and third conduits 68, 70, 72, may be provided for the fluid additive pumping apparatus 50 and may form component parts of the fluid additive path 52 which fluidly connects the fluid additive reservoir 54 to the fluid additive injector element 56 as well as various other elements of the fluid additive pumping apparatus 50. Illustratively, the conduits 68, 70, 72 of the fluid additive path 52 may include a first conduit 68 which fluidly connects the fluid additive reservoir 54 to the fluid additive pump assembly 58, a second conduit 70 which fluidly connects the fluid additive pump assembly 58 to the fluid additive flow sensor 66 and the fluid additive flow valve 64, and a third conduit 72 fluidly connecting the flow sensor 66 and the flow valve 64 to the fluid additive injector element 56, although other additional conduits may be utilized.

Optionally, the fluid additive pumping apparatus 50 may include an agitator device 74, shown in FIG. 1, which is configured to agitate or mix the contents of the fluid additive reservoir 54 to encourage suspension of substances in a fluid medium forming the fluid additive 8, and at least a portion of the agitator device 74 may be positioned in the interior of the fluid additive reservoir 54. As a further option, a reservoir sensor 76 may be configured to sense a quantity characteristic of the fluid additive 8 in the fluid additive reservoir 54. For example, as illustrated in FIG. 1, the reservoir sensor 76 may be configured to sense a minimum level of fluid additive 8 in the bottom of the fluid additive reservoir 54 to provide notification that the quantity of the fluid additive 8 in the reservoir 54 is relatively low or the reservoir 54 is empty. In some embodiments, the reservoir sensor 76 may be configured to sense a level of the fluid additive 8 in the interior of the fluid additive reservoir 54 to provide an indication of the quantity of fluid additive 8 in the reservoir 54 at any level.

A backflow preventing valve 78, typically located at the center structure 19, may be provided to impede the flow of the primary fluid, such as water, from the fluid application assembly 30 into the fluid additive pumping apparatus 50, and in particular into the fluid additive reservoir 54 of the fluid additive pumping apparatus 50.

The irrigation system 10 may also include a power supply 80 which may be configured to provide power to operate various elements of the system, such as elements of the fluid additive pumping apparatus 50. Optionally, the power supply 80 may be shared with elements (not shown) of the irrigation apparatus 12, or the power supply 80 may be completely independent of the power system of the irrigation apparatus 12 (as shown in FIG. 1).

Referring again to FIG. 1, the fluid additive pumping apparatus 50 may include additional optional elements including fluid additive pressure sensor devices 67 at various locations along the fluid additive path 52 in order to monitor the pressure of the fluid additive 8 between the fluid additive reservoir 54 and the fluid additive injector element 56 at the flow valve 64 and/or at the fluid application assembly 30. Further, sight tubes (not shown) may be employed to provide visual indication of additive fluid 8 levels, such as in the fluid additive reservoir 54.

Significantly, the fluid additive pumping apparatus 50 may also include a pump apparatus controller 90 which is configured to adjust the rate of pumping of an additive fluid 8 to the injection element 56 for injection into the fluid application assembly 30, and more specifically into the fluid supply conduit 34. In some of the most preferred embodiments, the pump apparatus controller 90 may be in communication with both the fluid additive flow sensor 66 and the pump motor 62 of the fluid additive pump assembly 58. Using flow data from the fluid additive flow sensor 66, the pump apparatus controller 90 may be configured to adjust the speed (RPM) of pump motor 62 to vary the flow rate of pumping of fluid additive 8 into the primary fluid (water) of the irrigation apparatus 12. Said adjustments to the speed of pump motor 62 may be executed by the pump apparatus controller 90 according to factors in situations set forth in this disclosure.

The pump apparatus controller 90 of fluid additive pumping apparatus 50 may also be in communication with the position sensor assembly 46 to receive information regarding the current position of the distal-end of the outermost third span 17 in a corresponding wheel track 29 of the irrigation apparatus 12 in the field 1. Such position information may include a current time and may be stored in memory 91 and used by processor 92 of the pump apparatus controller 90 to calculate an adjusted rate of flow of fluid additive 8 being pumped by the fluid additive pump assembly 58 through third conduit 70 for injection through injection element 56 into the fluid supply conduit 34 of the fluid application assembly 30.

Further, the pump apparatus controller 90 may be in communication with the fluid additive pump assembly 58 to control operation of the pump device 60, by varying the speed of pump motor 62, to establish fluid pressure and flow within the fluid additive pumping apparatus 50 and facilitate adjustments to the rate of pumping of the fluid additive 8 through the fluid additive injector element 56 and into the fluid application assembly 30.

The pump apparatus controller 90 may be configured to store in memory 91 a target injection rate of the fluid additive 8. The target injection rate may be provided or input to memory 91 of the pump apparatus controller 90 by an operator of the fluid additive pumping apparatus 50, or may be calculated by the processor 92 of the pump apparatus controller 90 based upon input of the target application rate for the field sector 3 (FIG. 2) of the field 1 from the operator, such as in terms of a liquid volume of the fluid additive 8 applied per unit of irrigated area of the ground surface 2, e.g., ounces of fluid additive 8 per acre of ground surface 2 irrigated by the irrigation apparatus 12, from which the pump apparatus controller 90, using memory 91 and processor 92, may calculate the rate at which the fluid additive 8 (e.g., a chemical solution) is to be pumped through fluid additive injector element 56 and into the primary fluid (irrigation water) to achieve the target injection rate for a sector 3 of a field 1 for the particular fluid additive 8.

The pump apparatus controller 90 is in communication with the fluid additive flow sensor 66 to obtain information on the current rate of flow of fluid additive 8 through fluid additive flow valve 64. Pump apparatus controller 90 may be configured to control the pump motor 62 speed to maintain a predetermined rate of pumping (flow) by pump device 60 of additive fluid 8 to fluid additive injector element 56.

With reference to FIG. 2, the irrigation apparatus 12 is illustrated to be positioned within a sector 3 of a field 1. A sector 3 may define a pie shaped area within field 1, or the whole field, with a start position 42 and a stop position 43. With a counter-clockwise movement direction 44, irrigation apparatus 12 is shown in place between the start position 42 and a stop position 43 of field sector 3. A sector 3 may be treated with a fluid additive 8 pumped by the fluid additive pumping apparatus 50 from a fluid additive reservoir 54 through a fluid additive flow valve 64 and a fluid additive flow sensor 66 into fluid additive injector element 56 where fluid additive 8 is injected with the primary fluid for distribution through the fluid supply conduit 34 of the fluid application assembly 30 over the area of field 1 defined by the sector 3.

With reference to FIG. 2, the pump apparatus controller 90 may further be configured to receive and store in memory 91 both a predetermined start position 42 of the outermost third span 17 of the irrigation apparatus 12 and a predetermined stop position 43 of the outermost third span 17 of the irrigation apparatus 12. The start position 42 and the stop position 43 may be provided by the operator of the irrigation system 10 by manual input or by electronic communication to the pump apparatus controller 90 via a data communication network (not shown).

The area of the ground surface 2 between a start position 42 and stop position 43 of the spans 14, 16, 17 may thus define the field sector 3 of the field 1 to be treated with fluid additive 8 by the irrigation apparatus 12 during a particular irrigation session of operation. The pump apparatus controller 90 may be provided with a processor 92 and memory 91 to receive and store information such as the predetermined start position 42 and stop position 43 and the predetermined start and stop times as well as other information.

The pump apparatus controller 90 may be configured to receive a predetermined start time for initiating pumping corresponding to the movement of the irrigation apparatus 12 from the start position 42, and may also be configured to receive a predetermined stop time when the irrigation apparatus 12 is expected or projected or intended to reach the stop position 43 of a sector 3 for discontinuing pumping of fluid additive 8 and discontinuing movement of the irrigation apparatus 12, the pump apparatus controller 90 being configured to store the predetermined start time and the predetermined stop time.

In some implementations, determination of the intended speed of movement over the ground surface 2 may be received from an operator of the irrigation system 10, and may be based upon the desired application rate of the primary fluid (water) to the soil and any plants in the field sector in the field 1. In other implementations, the intended speed of movement may be determined based upon, for example, start and stop position 42, 43 and start and stop times. For example, the intended speed of movement may be calculated using a difference between the start position 42 and the stop position 43 of the spans 14, 16, 17 (e.g., the amount of ground surface 2 to be covered) and a difference between the start and stop times corresponding to the start position 42 and stop position 43 (e.g., the time to cover the amount of ground surface 2 made up by sector 3).

With further reference to FIG. 2, the pump apparatus controller 90 may be configured to initiate pumping of the fluid additive 8 to achieve a target injection rate at the start position 42 of the spans 14, 16, 17 and discontinue pumping of the fluid additive 8 at the stop position 43 of the spans 14, 16, 17, through signals sent by the position sensor assembly 46 to elements of the fluid additive pumping apparatus 50.

Once the distal-end of the outermost third span 17 of the irrigation apparatus 12 has commenced movement at the intended speed of movement, the pump apparatus controller 90 may be configured to periodically compare the current position of the distal-end of the outermost third span 17, indicated by the position sensor assembly 46, to the start position 42 and the stop position 43 of the span 17 in order to determine when the elements of the fluid additive pumping apparatus 50 need to be powered on and powered off.

The pump apparatus controller 90 of the fluid additive pumping apparatus 50 may be further configured to periodically determine an actual speed of movement of the distal-end of the outermost third span 17 of the irrigation system 10 over the ground surface 2, and such a determination may be based upon the current position of the distal-end of the outermost third span 17 with respect to the start position 42 of the span 17 and a current time with respect to the start time. The pump apparatus controller 90 may also be configured to calculate a projected arrival time for the distal-end of the outermost third span 17 of the irrigation system 10 at the stop position 43 of sector 3. In implementations, the calculation of projected arrival time may be based upon the current time, the actual speed of movement, and the current position of the distal-end of the outermost third span 17, relative to the stop position 43 of the irrigation apparatus 12 within a sector 3.

Additionally, the pump apparatus controller 90 may be configured to periodically determine an adjusted pumping rate based upon the current position, at a current time, of the distal-end of the outermost third span 17. The pump apparatus controller 90 may be configured to change from a target or a current rate of pumping and injecting to the adjusted rate of pumping and injecting for further operation of the fluid additive pumping apparatus 50 by controlling the applicable elements (e.g., speed of pump motor 62 of the fluid additive pump assembly 58) of the fluid additive pumping apparatus 50.

Figure 4:
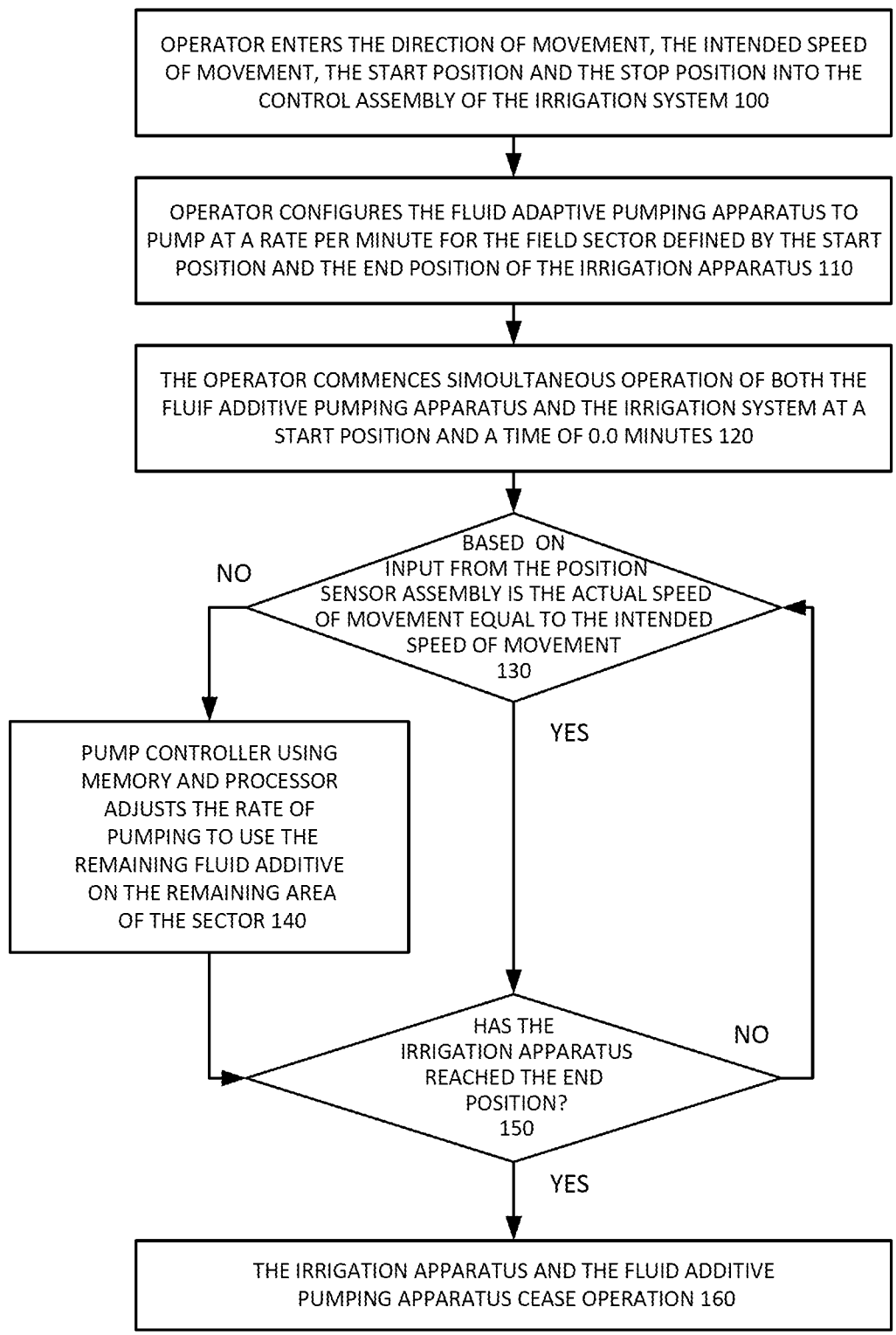
FIG. 4 is a schematic flow diagram of aspects of an illustrative implementation of a method of the present disclosure.

The above disclosure may be best illustrated by example using data assumptions stored in memory 91 and by using select algorithms provided in a processor 92. With reference to FIG. 2 and FIG. 4, assume:

1. using control assembly 40, the operator may set or configure the irrigation apparatus 12 to move in a counter-clockwise movement direction 44 starting at a start position 42 and ending at a stop position 43 (Block 100 of FIG. 4);
2. using control assembly 40, the operator may set or program an intended speed of movement for the corresponding drive assembly 24 of support tower 23 of the outermost third span 17 over the ground surface 2 in a corresponding wheel track 29 of 100 feet per minute while applying an additive 8 to sector 3 (Block 100 of FIG. 4);
3. using the pump apparatus controller 90, the operator may configure the fluid additive pumping apparatus 50 to pump and inject fluid additive 8 at a rate of ten gallons per minute while irrigation apparatus 12 may be configured to traverse a sector 3 at an intended speed of movement of 100 feet per minute for the distal-end of the outermost third span 17 (Block 110 FIG. 4);
4. using pump apparatus controller 90 and control assembly 40, the operator may have commenced simultaneous operation of both the fluid additive pumping apparatus 50 and the irrigation apparatus 12 at the start position 42 of sector 3 at a time of 0.0 minutes and the systems may be currently operating within the boundaries of a sector 3 (Block 120 FIG. 4).

The above assumptions may simply define a current condition with a manual setup and start by an operator for the operation of irrigation apparatus 12 and a corresponding fluid additive pumping apparatus 50.

Figure 3:
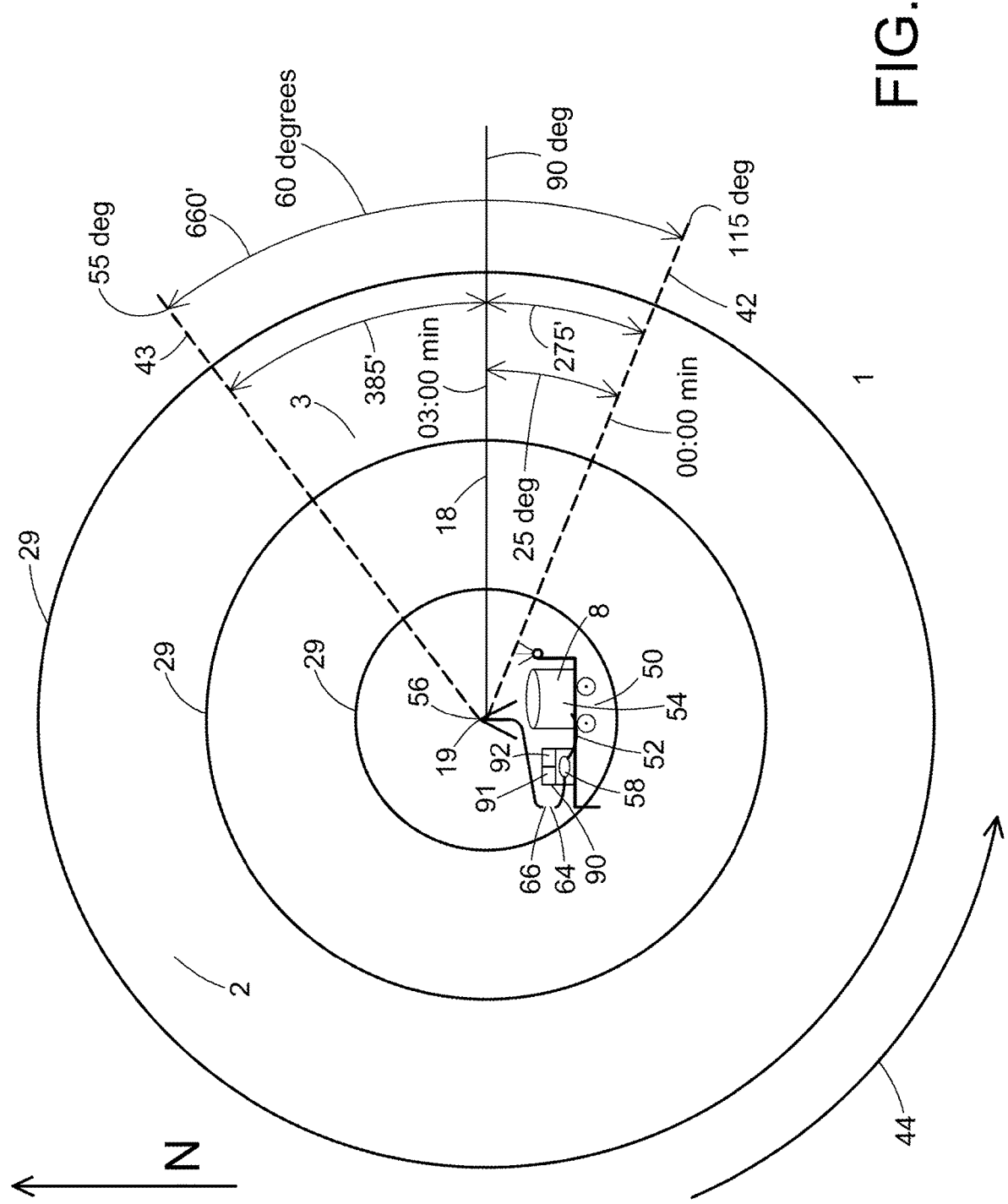
FIG. 3 is a schematic diagram of a field with a field sector illustrative of variables used by the pump apparatus controller of the fluid additive pumping apparatus to control a rate of pumping of fluid additive to said sector.

With reference to FIG. 2, FIG. 3, and FIG. 4, assume:
1. the start position 42 of sector 3 is at a degree location of 115 degrees, south east, and is stored in memory 91;
2. the stop position 43 of sector 3 is at a degree location of 55 degrees, north east, and is stored in memory 91;
3. the distance in feet along the corresponding wheel track 29 of outermost drive assembly 24 of third support tower 23 of the outermost third span 17 from start position 42 to stop position 43 may be 660 feet with 60 degrees of movement (115−55=60) over a sector 3 of the field 1, or 11.0 feet per degree of movement (660 feet/60 degrees=11 feet per degree, and the value 11.0 feet per degree may be stored in memory 91;
4. using data stored in memory 91 the processor 92 may be configured to use algorithms to calculate:
    a) the total intended period of time required for irrigation apparatus 12 to traverse from start position 42 (115 degrees) to stop position 43 (55 degrees) at 100 feet per minute speed of movement for the distal-end of the outermost third span 17 as follows:

660 feet/100 feet per minute=6.6 minutes;

b) the period of time for one degree of movement:

6.6 min/60 degrees=0.11 min or 6.6 secs;

5. the total volume of additive fluid 8 intended to be pumped from fluid additive reservoir 54 and injected by fluid additive pumping apparatus at the predetermined pumping rate of 10 gallons per minute and the intended speed of movement of 100 feet per minute may be calculated by processor 92 and stored in memory 91 as: 6.6 minutes@10 gallons per minute=66 gallons;
6. the irrigation apparatus 12 may commence moving in a counter-clockwise direction of movement 44 from start position 42 (115 degrees) at a time of 0:00 minutes (Block 120 FIG. 4);
7. at a current time of 03:00 minutes, the position sensor assembly 46 may communicate a current position within a sector 3 of the longitudinal axis 18 of irrigation apparatus 12 of 90 degrees, straight east (FIG. 3 and Block 130 FIG. 4);

Using above data stored in memory 91 and using processor 92, the pump apparatus controller 90 may calculate an adjustment to the current rate of pumping and injecting of additive fluid 8 of 10 gallons per minute as follows (Block 140 FIG. 4):

Starting at start position 42 (115 degrees), 180 seconds (3.0 minutes) of counter-clockwise movement direction 44 at the intended speed of movement of 100 feet per minute for the distal-end of the outermost third span 17 would move the longitudinal axis 18 an intended 27.3 degrees:

180 seconds/6.6 seconds per degree=27.3 degrees

The actual position of the longitudinal axis 18 is 90 degrees, as reported by position sensor assembly 46 to memory 91 of pump apparatus controller 90 after 3.0 minutes of movement. The actual movement of the longitudinal axis 18 of irrigation apparatus 12 is just 25 degrees (115 degrees−90 degrees), indicating a slower than intended speed of movement over the 3.0 elapsed minutes (Block 130 FIG. 4). The ratio of actual degrees of movement, 25.0 degrees, to the intended degrees of movement, 27.3 degrees, is (25.0/27.3)=91.6. The actual speed of movement of a corresponding drive assembly 24 of support tower 23 of outermost third span 17 of the irrigation apparatus 12 along outermost wheel track 29 may be calculated as.

91.6%*100 feet per minute=91.6 feet per minute

Using data stored in memory 91 and using processor 92, the pump apparatus controller 90 may calculate a remaining volume of fluid additive 8 in fluid additive reservoir 54 as:

66 gallons−(3.0 min*10 gal per min)=36 gallons.

Using data stored in memory 91 and using processor 92, the pump apparatus controller 90 may calculate the remaining degrees to be treated in a sector 3 as:

60 degrees−25 degrees=35 degrees remaining.

Using data stored in memory 91 and using processor 92, the pump apparatus controller 90 may calculate the remaining feet of movement required by the distal-end of the outermost third span 17 (defining the longitudinal axis 18 of irrigation apparatus 12) to move 35 degrees in a counter-clockwise direction of movement 44 in a corresponding wheel track 29 from a current position of 90 degrees to reach the stop position 43 at 55 degrees as:

35 degrees*11.0 feet per degree=385 feet.

Using data stored in memory 91 and using processor 92, the pump apparatus controller 90 may calculate the remaining time for the drive assembly 24, moving in wheel track 29, of the outermost third span 17 to reach the stop position 43 of 55 degrees as:

385 feet/91.6 feet per minute=4.2 minutes.

Using data stored in memory 91 and using processor 92, the pump apparatus controller 90 may calculate the adjusted pumping rate to consume the calculated remaining fluid additive of 36 gallons as (Block 140 FIG. 4):

36 gallons/4.2 minutes=8.6 gallons per minute.

The above calculations may be used by the pump apparatus controller 90 to adjust the rate of pumping by the fluid additive pumping apparatus 50 from 10.0 gallons per minute to 8.6 gallons per minute for the remaining 35 degrees of movement required to complete the fluid additive application to a sector 3 in the next 4.2 minutes (Block 150 FIG. 4). When the distal-end of outermost span 17 reaches the stop position 43, both the irrigation system 10 and the fluid additive pumping apparatus 50 cease operation. (Block 160 FIG. 4).

In other embodiments of the present invention the calculation of the factor in the above example of 91.6% used to adjust the 10 gallon per minute pumping rate to 8.6 gallons per minute may be processed by using feet of movement of the drive assembly 24 of the outermost third span 17 along corresponding wheel track 29 rather than using degrees of movement. For example, the intended feet of movement of the distal-end of the outermost third span 17 of the irrigation apparatus 50 during the three minutes of operation preceding the position sensor assembly 46 position report of 90 degrees may be calculated as:

3.0 minutes*100 feet per minute=300 feet

The actual feet of movement by the distal-end of the outermost third span 17 of the irrigation apparatus 50 based on the position report from the position sensor 46 at the three minute mark was 275 feet. Using feet of movement, the factor to adjust the rate of pumping may be determined by a processor as follows:

Pumping rate adjust factor=275 feet/300 feet=91.6%

Using feet of movement rather than degrees of movement may facilitate calculation of the pumping rate adjustment factor (e.g., 91.6%) for lateral move irrigation systems that operate with linear movement of the spans rather than circular movement of the spans.

The pump apparatus controller 90 may also be configured to periodically receive the current position of the distal-end of the outermost third span 17 of the irrigation system 10 and to periodically calculate a further adjusted pumping rate of injection of fluid additive 8 to be utilized for further operation of the fluid additive pumping apparatus 50, such as performing additional adjustments of the pumping rate to reflect a new adjusted pumping rate as the spans 14, 16, 17 of the irrigation apparatus 12 move closer and closer to the stop position 43 of sector 3 (Block 140 FIG. 4).

The fluid additive pumping apparatus 50 may be associated with the fluid application assembly 30 of the irrigation apparatus 12 in any suitable manner, such as on a carriage capable of being positioned at a suitable location proximate to the center structure 19 or any position proximate to the fluid supply conduit 34 of the irrigation apparatus 12, and may be readily movable or transportable among individual irrigation apparatus 12 in different fields 1, or portions of a field 1.

As a further option, utilization of aspects of the present disclosure may permit the utilization of an irrigation apparatus 12 as a pseudo sprayer of substances onto the soil and/or plants in an agricultural field without significant flow of water through the irrigation apparatus 12. In particular, an irrigation apparatus 12 providing continuous, or substantially continuous, movement of the spans 14, 16, 17 may provide a platform for utilizing the irrigation apparatus 12 as a pseudo sprayer, particularly when combined with aspects of the present disclosure related to varying the rate of application (pumping) based upon actual operating conditions in the agricultural field 1. Relatively high speed movement of said irrigation apparatus 12 across the ground surface 2 (i.e., 100 feet per minute), as well as substantially continuous or constant movement, may provide suitable application rates with good uniformity of the application of fluid additive 8, and do so even with very low primary fluid flows in which the fluid additive 8 being applied is incorporated, i.e., relatively small volumes of water.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, sub steps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. An irrigation system for distributing a primary fluid or water supply over a ground surface of a field, the system including:
  an irrigation apparatus movable over the ground surface to distribute the primary fluid over the ground surface within a sector of the field, the irrigation apparatus comprising:
  a center structure configured to support a first-end of a first span and to center rotation of distal ends of a plurality of interconnected spans extending outward from the center structure, wherein the first span is separate from the plurality of interconnected spans;
  at least two spans, each comprising a first-end closest to the center structure and a distal-end extending along a longitudinal axis of the system;
  at least one support tower for each span of the plurality of interconnected spans configured to support corresponding spans at a location above the ground surface;

a fluid application assembly with a fluid supply conduit configured to apply the primary fluid to the ground surface of the sector of the field;

a fluid additive pumping apparatus configured to pump a fluid additive into the primary fluid distributed by the fluid application assembly of the irrigation apparatus as the irrigation apparatus moves over the sector of the field, the fluid additive pumping apparatus comprising:

a fluid additive pump assembly in fluid communication with a fluid additive reservoir and a fluid additive injector element via a fluid additive path, said fluid additive path originating at said fluid additive reservoir and terminating at said fluid additive injector element, said fluid additive pump assembly is configured to pump a predetermined volume of fluid additive into the fluid application assembly in a predetermined period of time for distribution of fluid additive to the sector of the field, wherein said predetermined period of time to pump the predetermined volume of fluid additive is used to determine a rate of pumping, said rate of pumping for said predetermined period of time also corresponding to a period of time for the spans to transition over the sector of the field at an intended speed of movement over the ground surface, following a corresponding wheel track for the distal-end of the outermost span, wherein the outermost span is one of the plurality of interconnected spans, from a start position to a stop position of the sector of the field, a pump apparatus controller with a memory and a processor, wherein said pump apparatus controller has stored in memory the start position, the stop position, a predetermined start time and a predetermined stop time for application of fluid additive to the sector of the field, a position sensor assembly in communication with the pump apparatus controller, said position sensor assembly configured to periodically sense at a current time a current position within the corresponding wheel track of the distal-end of the outermost span of the irrigation apparatus within the sector of the field, and a fluid additive flow sensor in communication with the pump apparatus controller, said fluid additive flow sensor configured to monitor a rate of flow of the fluid additive being pumped through the fluid additive path by the fluid additive pump assembly; and wherein said pump apparatus controller is configured to be in communication with said position sensor assembly, said fluid additive pump assembly and said fluid additive flow sensor and is configured to receive a current position signal and the current time from said position sensor assembly and is configured to store said current position and the current time in said memory, the pump apparatus controller, using the memory and the processor, is configured to calculate an actual speed of movement of the distal-end of the outermost span as the outermost span transitions through the sector of the field following a corresponding wheel track, based on the calculated actual speed of movement, as compared to the intended speed of movement, the processor further calculates an adjusted fluid additive pumping rate, said adjusted fluid additive pumping rate is configured to be proportionally decreased when the actual speed of movement of the distal-end of the outermost span is slower than the intended speed of movement, wherein said adjusted fluid additive pumping rate is configured to be proportionally increased when the actual speed of movement of the distal-end of the outermost span is faster than the intended speed of movement, wherein adjustments to the rate of pumping by the fluid additive pump assembly are configured to be performed periodically; and further wherein said pump apparatus controller calculates the adjusted fluid additive pumping rate based on the actual speed of movement of the distal-end of the outermost span calculated from the current position, the current time and a user-defined stop position and calculates a remaining time period for the outermost span to reach said stop position and wherein said pump apparatus controller monitors an output signal of the fluid additive flow sensor and controls the fluid additive pump assembly to pump fluid additive at an adjusted rate so as to distribute the remaining supply of fluid additive to the sector of the field, as the irrigation apparatus continues moving to reach the user-defined stop position in the remaining time period, based on said calculated actual speed of movement for said distal-end of the outermost span.

2. The system of claim 1, wherein the pump apparatus controller is configured to receive a target rate of pumping to achieve a target injection rate for injection of the fluid additive into the primary fluid in the fluid supply conduit to achieve a target application rate of the fluid additive to the sector of the field.

3. The system of claim 1, wherein the pump apparatus controller is configured to calculate a target rate of pumping to achieve a target injection rate for injection of the fluid additive into the primary fluid in the fluid supply conduit to achieve a target application rate of the fluid additive to the sector of the field.

4. The system of claim 1, wherein the pump apparatus controller is in communication with the position sensor assembly to receive information regarding the current position of the distal-end of the outermost span and wherein the pump apparatus controller is in communication with the fluid additive flow sensor to adjust the rate of flow by a pump motor.

5. The system of claim 1, wherein the actual speed of movement is calculated using a difference between the start position of the distal-end of the outermost span and an actual current position of the distal-end of the outermost span compared to a corresponding difference between the start time and the current time with reference to an intended current position of the distal-end of the outermost span.

6. The system of claim 1, wherein the actual speed of movement is calculated using a difference between a distance moved of the distal-end of the outermost span along the corresponding wheel track from the start position to an actual current position compared to a corresponding difference between the start time and the current time with reference to an intended current position of the distal-end of the outermost span.

7. The system of claim 1, wherein the pump apparatus controller is configured to calculate a volume of fluid additive pumped and the fluid additive remaining to be pumped based on a period of time the irrigation apparatus operated from the start position and start time to the current position and the current time as reported by the position sensor assembly.

8. The system of claim 1, wherein the pump apparatus controller is configured to initiate pumping of the fluid additive at a target injection rate at the start position of the distal-end of the outermost span and discontinue injection of the fluid additive at the stop position of the distal-end of the outermost span; and wherein, after initiation of pumping of the fluid additive, the pump apparatus controller is configured to determine an adjusted pumping rate based upon a projected arrival time of the distal-end of the outermost span at the current position after traversing a portion of the sector of the field and based on the volume of fluid additive remaining to be pumped, the pump apparatus controller being configured to change the rate of pumping by the fluid additive pump assembly from a target pumping rate to the adjusted fluid additive pumping rate for further operation of the fluid additive pumping apparatus.

9. The system of claim 1, wherein the pump apparatus controller is configured to determine an adjusted pumping rate of a fluid additive by comparing the current position at the current time of the distal-end of the outermost span indicated by the position sensor assembly to the start position at a start time of the distal-end of the outermost span to determine the actual speed of movement of the outermost span of the system, the actual speed of movement being based upon the current position of the distal-end of the outermost span with respect to the start position of the outermost span and the current time with respect to the start time of movement of the distal-end of the outermost span from the start position.

10. The system of claim 1, wherein the pump apparatus controller is configured to calculate a projected arrival time for the distal-end of the outermost span of the system at the stop position based upon the current time, the actual speed of movement, and the current position of the outermost span relative to the stop position of the system; and wherein the pump apparatus controller is configured to calculate a remaining time for pumping of a remaining volume of fluid additive based upon the current time and the projected arrival time, and determine an adjusted pumping rate based upon the remaining time for pumping of the remaining volume of fluid additive.

11. The system of claim 1, wherein the pump apparatus controller is configured to periodically receive the current position of the distal-end of the outermost span of the system and calculate a further adjusted pumping rate to be utilized for further operation of the fluid additive injector element of the system.

* * * * *